May 8, 1934. W. R. GRISWOLD 1,957,775
TRANSMISSION MECHANISM
Filed Sept. 30, 1931
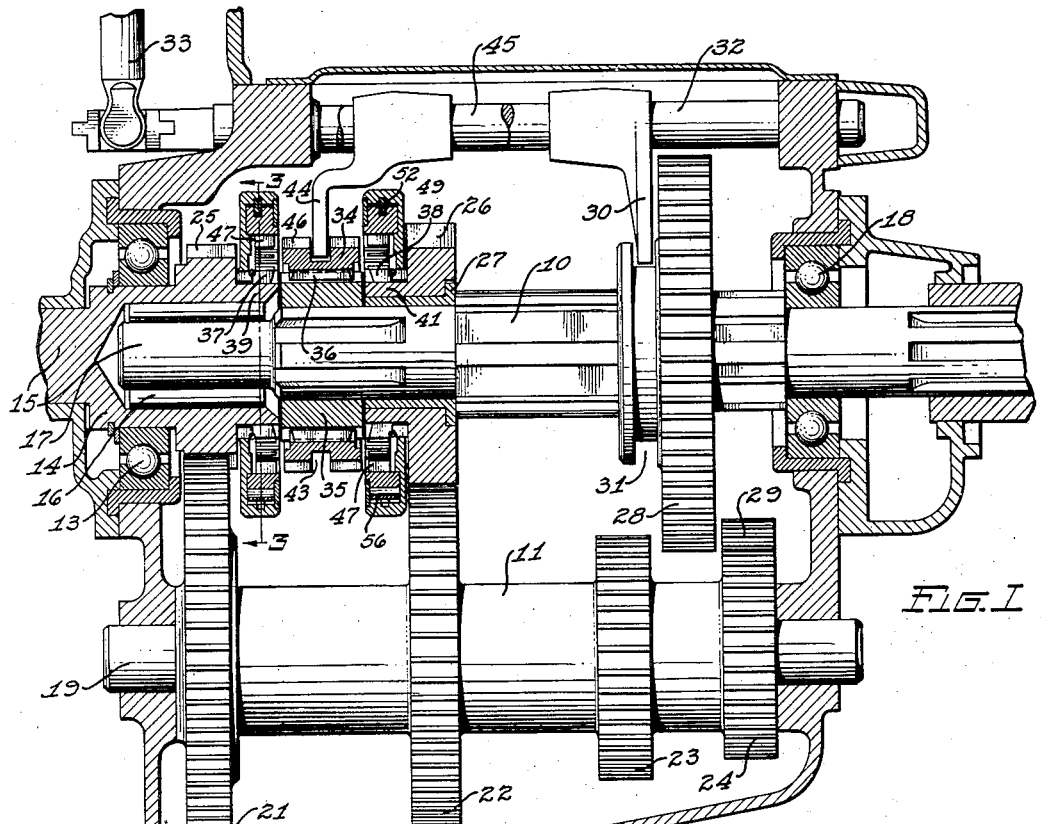
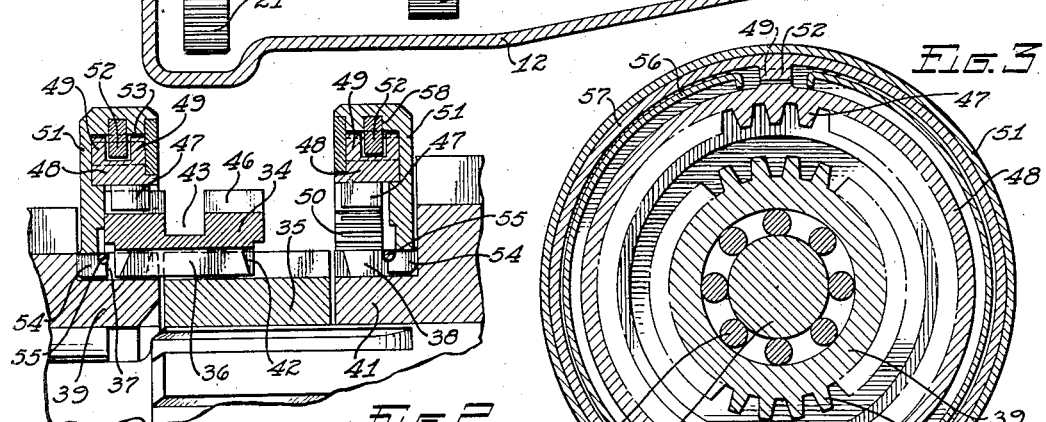
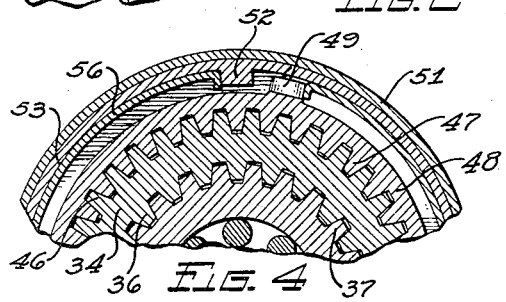
Inventor
WALTER R. GRISWOLD.

Patented May 8, 1934

1,957,775

UNITED STATES PATENT OFFICE 1,957,775

TRANSMISSION MECHANISM

Walter R. Griswold, Detroit, Mich., assignor to Packard Motor Car Company, Detroit, Mich., a corporation of Michigan Application September 30, 1931, Serial No. 565,971

7 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been in general cumbersome and complicated, and the operating means have been subjected to excessive wear, and in the more effective devices have been of a nature such as to require release of the synchronizing member immediately upon engagement of the gears or positive driving means. This, in turn, has required a more or less sensitive and complex timing mechanism.

One of the objects of this invention is to provide a motor vehicle transmission with an improved device for synchronizing the gear elements, which shall be simple and effective, and in which the operation of the synchronizing clutches shall be effected through rotating parts not subjected to high relative speeds.

Another object of the invention is to provide a device of the character designated in which friction synchronizing means shall be brought into engagement with a force proportional to the difference in linear speeds of the parts to be synchronized.

Another object of the invention is to provide a self-energizing synchronizer in order to obviate the possibility of the vehicle operator having to provide objectionable physical effort to accomplish synchronizing.

Another object of the invention is to provide an improved transmitting mechanism to effect the movement of the synchronizing means from the movement of the positive clutch means toward engaging position.

Other objects of the invention will appear from the following description taken in connection with the drawing, which forms a part of this specification, and in which:

Fig. 1 is a view, partially in side elevation and partially in longitudinal vertical section through a motor vehicle transmission embodying the present invention;

Fig. 2 is an enlarged view of a portion of Fig. 1 with the parts engaged in driving relation;

Fig. 3 is a detailed sectional view taken substantially on the line 3—3 of Fig. 1 and Fig. 4 is a view of the parts shown in Fig. 3 when the parts of the synchronizer are engaged in synchronizing position.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27. The sleeve is pressed or otherwise rigidly mounted on the shaft 10.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

In the illustrated embodiment of the invention, gear 28 may be moved to mesh with gear 23, to provide a first speed, or connected through pinion 29 to gear 24 to provide a reverse drive. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This device constitutes a dog clutch or toothed clutch ring element 34 splined to rotate with the shaft 10. For assembly purposes an intermediate collar 35 is shown between the shaft and the dog clutch. Internal teeth 36 on the positive clutch member are adapted to be shifted into mesh with external teeth 37 or 38 on extensions 39 and 41 of gears 25 and 26 respectively. To facilitate smoother engagement, the ends of the teeth 36 are bevelled as shown at 42.

To effect the sliding or shifting movement of the positive clutch ring, this member is provided with a shifter groove 43 actuated by a shifter fork 44 which is connected to a shifter rod 45 similar to the rod 32 and likewise selectively operable by the gear shift lever 33. To perform the clutching operation without clash, this invention provides a synchronizing device actuated by the positive clutch element and adapted to bring the pairs of clutch teeth 36—37 or 36—38 to the same linear speeds before positive engagement may occur.

For this purpose the positive clutch member 34 is formed with external teeth 46 which may be engaged, upon axial movement, with synchronizer operating teeth 47 mounted to be engaged by the teeth 46 before engagement occurs between the teeth 36—37 or 36—38.

Internal teeth 47 are formed on a floating intermediate element 48 provided with radially extending abutments 49 and surrounded by a casing 51, which casing has an abutment 52 projecting internally from a drum or friction surface 53. The casing or supporting members 51 are toothed or splined as at 54 and slid in place on the extensions 39 and 41 of gears 25 and 26. Spring retaining rings 55 prevent axial movement of the casings after they have been assembled in position.

Between the toothed ring element 48, or positively engageable portion of the synchronizer, and the outer encasing member 51, I locate a clutch band member 56 which is adapted frictionally to engage with the internal drum surface 53 of the casing. Such engagement takes place when the outer and inner abutments 52 and 49 are moved with respect to each other, this relative movement serving to expand the clutch band member 56. In Fig. 4 the clutch band 56 is shown expanded into synchronizer applied position as the result of such movement.

It is evident that the action of the clutch band is of the servo or wrapping type in which only a small force is required for its actuation. Consequently the synchronizer is extremely easy to operate. It is also clear that once the clutch band has been circumferentially expanded, by the action of the abutments, into contact with the friction surface 53, the action of the synchronizer will depend upon the tendency towards relative movement between the abutments, or between the driving and driven members of which each is a part.

If each abutment is rigidly attached to its supporting means, I have found the servo action of the synchronizer to be more severe than is sometimes desirable and I have consequently provided in this invention means for yieldably mounting one of the abutments. These means are clearly shown in the drawing in which it will be seen that abutment 52 is formed on a snap-ring 57 sprung into place in a groove 58 of the same or greater radial dimension as the snap-ring. The frictional engagement of the snap-ring with the casing member 51 is designed to resist movement of the abutment until after the servo friction action between the drum face and the clutch band has exceeded the desired maximum. This maximum figure will vary for the several types of conditions in which the synchronizer may be used and it may be readily determined experimentally in any particular case.

After the clutch band has been engaged with the drum, and its resisting torque exceeds that required to move the yieldably mounted abutment, then it is evident that no further increase in friction action may be obtained except the relatively minor amount due to a slight servo action of the snap-ring in its groove. This slight additional servo action is itself variable by the designer as the distance between the abutment and the end of the snap-ring is varied. This distance of course is to be decided on after experiment and may readily be changed to suit varying classes of transmission service.

The operation of the above described synchronizer will be evident from the enlargement of Fig. 2. It is seen that axial movement of the shifter collar 34 engages the positively driven portion 48 of the synchronizing or friction clutch. If relative rotation is occurring between the driven shaft 10 and either of the driving members, the clutch shaft 15 or the second speed gear 26, such rotation will tend to cause relative movement between the two abutments located between the ends of the clutch band. The rate of this movement will vary with the rate of rotation between the driving and driven members and will thus also vary the rate at which the servo action will commence.

In order to minimize any shock of engagement between the dog clutch member 34 and the positively driven ring 48 of the synchronizer, I relieve every other tooth 47 of the latter. This is clearly shown in the right-hand ring 48 of Fig. 2, the set-back being indicated at 50.

As the tendency towards relative movement between the abutments is not dampened by the movement shown in Fig. 4 between the abutments 49 and 52, and the driving and driven members are still not synchronized, then, in order to prevent jarring action, the abutment 52 will be displaced yieldably as set forth above. This displacement accomplished by the servo action of the clutch band will continue until synchronism occurs.

The positive clutch element 34 has, by this time, reached such a position that its internal teeth 36 are about to engage with the external teeth 37 on the clutch shaft. Further movement of the positive clutch element will accomplish this engagement and consequently cessation of synchronizing torque. The transmission is now engaged in direct drive.

It will be self-evident that disengagement of the positive clutch element 34 with the clutch shaft 15 will allow the synchronizing clutch band 56 to assume a neutral position and the synchronizer will then be ready for another engagement.

The operation of this device has been described in connection with the gear change from neutral to high gear or direct drive but the change from neutral to second by which gear teeth 36 and 38 are engaged, is effected in a similar manner as will be readily understood.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle transmission having a driving member, a driven member, positive clutch means movable to connect said members, and synchronizing connecting means between said members operable by movement of the positive clutch means prior to the formation of a positive connection, said synchronizing means including an axially extending friction surface rotatable with one of said members, an abutment associated with said friction surface, a radially expansible self-energizing clutch band engageable with said friction surface, and a second abutment rotatable with the other of said members, said abutments being positioned between the ends of said clutch band.

2. In a motor vehicle transmission, a driving member, a driven member, positive clutch means movable to connect said members, a friction clutch between said members operable by and in advance of the positive clutch, and abutments for operating the friction clutch, said abutments rotating respectively with the driving and driven members, one of said abutments being yieldably mounted and the other being rotatable relative to its associated member.

3. In a motor vehicle transmission having a driving member and a driven member, synchronizing mechanism for connecting said members, comprising a servo-operating clutch band between said members, means between the ends of said band to cause servo-operation thereof up to a predetermined maximum speed difference between said members, and yieldable means to cause a constant clutching action upon a further increase of speed difference.

4. In a motor vehicle transmission, a driving member, a driven member, a positive clutch between said members, and a friction clutch between said members, said positive clutch comprising an element for engaging the friction clutch in advance of positive clutch engagement, said friction clutch comprising a servo-operating clutch element and an abutment for causing said servo-operation, said abutment being movable after initiation of the friction clutching action.

5. In a motor vehicle transmission having a driving member and a driven member, clutch mechanism for connecting said members comprising a drum fixed to the driving member, a snap-ring frictionally engaging the drum, an abutment fixed to the snap-ring, a resilient clutch band within the drum adapted to frictionally engage therewith, a floating ring member in the drum having an abutment engageable with one end of the band, the snap ring abutment being engageable with the other end of the band, and a shiftable positive clutch element on the driven member engageable with the floating ring member and with the driving member, engagement of the ring member by the positive clutch element expanding the band to frictionally engage the drum and later rotating the snap-ring relative to the drum prior to engagement of the positive clutch element with the driving member.

6. In a motor vehicle transmission having a driving member and a driven member, clutch mechanism for connecting said members comprising a shiftable positive clutch element on the driven member for engaging the driving member, a drum on the driving member, and synchronizing means intermediate the positive clutch element and the drum including a pair of inter-acting telescopically arranged friction bands associated to be initially applied one in advance of the other.

7. In a motor vehicle transmission having a driving member and a driven member, clutch mechanism for connecting said members comprising a shiftable positive clutch element on the driven member for engaging the driving member, a drum on the driving member, and synchronizing means intermediate the positive clutch element and the drum including a pair of telescoping resilient friction bands within the drum, the outer one of said bands frictionally engaging the drum, and means actuated by the relative rotation of said drum and the positive clutch element for expanding said inner band.

WALTER R. GRISWOLD.